United States Patent [19]

Koller et al.

[11] 3,998,805
[45] Dec. 21, 1976

[54] SULPHATOETHYLENE (SULPHONYL OR SULPHONYLAMINO) PHENYLENEAZO DYESTUFFS

[75] Inventors: Stefan Koller, Ramlinsburg; Peter Aeschlimann, Allschwil, both of Switzerland

[73] Assignee: Ciba-Geigy Corporation, Ardsley, N.Y.

[22] Filed: Mar. 28, 1974

[21] Appl. No.: 455,779

[30] Foreign Application Priority Data

Apr. 4, 1973  Switzerland .................. 4798/73
Mar. 8, 1974  Switzerland .................. 3290/74

[52] U.S. Cl. .................. 260/207; 260/152; 260/156; 260/157; 260/154; 260/196; 260/207.1

[51] Int. Cl.² .................. C09B 29/08; C09B 29/26; D06P 1/06

[58] Field of Search .......... 260/196, 205, 206, 207, 260/207.1

[56] References Cited
UNITED STATES PATENTS

| | | | |
|---|---|---|---|
| 2,657,205 | 10/1953 | Heyna et al. ............... | 260/185 |
| 2,670,265 | 2/1954 | Heyna et al. ............... | 8/49 |
| 2,784,204 | 3/1957 | Heyna et al. ............... | 260/152 X |
| 3,114,754 | 12/1963 | Lodge et al. ............... | 260/157 X |
| 3,197,456 | 7/1965 | Kühne et al. ............... | 260/163 |
| 3,297,678 | 1/1967 | Kühne et al. ............... | 260/163 |
| 3,417,074 | 12/1968 | Kühne et al. ............... | 260/151 |
| 3,637,648 | 1/1972 | Kühne et al. ............... | 260/162 |
| 3,852,263 | 12/1974 | Siegel ....................... | 260/205 |

*Primary Examiner*—Floyd D. Higel
*Attorney, Agent, or Firm*—Joseph G. Kolodny; Edward McC. Roberts; Prabodh I. Almaula

[57] ABSTRACT

Dyestuffs of the formula

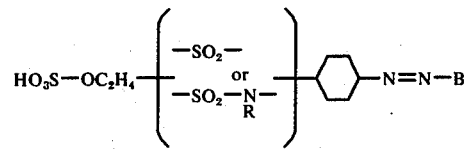

wherein B is the radical of a coupling component of the dispersion series, which is derived from an N-alkylated aniline or aminonaphthalene, and which contains in the o-position with respect to the azo bridge a free or acylated primary or secondary amino group, and which is free from water-solubilizing groups, R is a hydrogen atom, a cycloalkyl group or an optionally substituted alkyl group. The new dyestuffs give yellow, red or orange shades on polyester fibers and can be applied from aqueous baths without addition of dispersing agents.

9 Claims, No Drawings

SULPHATOETHYLENE (SULPHONYL OR SULPHONYLAMINO) PHENYLENEAZO DYESTUFFS

The invention relates to temporarily water-soluble disperse dyestuffs, to their preparation, and to their use for the dyeing and printing of hydrophobic synthetic organic material, especially polyester material.

Hydrophobic synthetic organic material, particularly polyester material, is dyed, as is known, with disperse dyestuffs such as are described, for example, in the Colour Index. These are coloured organic compounds which are free from water-solubilising groups, such as sulphonic acid groups or ammonium groups, and which are soluble in water to the extent only of traces, and which are absorbed via a phase dissolved as a molecular dispersion onto the material. For this purpose, the disperse dyestuffs have to be ground very finely before the actual dyeing process, and to be then stabilised in the aqueous dye bath by the addition of large amounts of dispersing agents. The dyestuff during dyeing is not in the form of a solution but in the form of a dispersion.

This factor often creates difficulties in practice, for these dyestuff dispersions are frequently unstable, with the dyestuff crystallising out, and uneven dyeings being obtained as a result. In high-temperature dyeing in particular, an inadequate dispersion stability becomes evident from filtration phenomena in the case of dense material being dyed on, for instance, cheese-dyeing and beam-dyeing machines. Furthermore, dispersing agents in large dyeing plants can give rise to the formation of foam; and, since dispersing agents are in most cases toxic, they lead to an appreciable contamination of the waste-water. Difficulties also arise in the dyeing of mixed fabrics, this being due to the fact that water-soluble dyestuffs frequently have poor compatibility with the dispersing agents in the disperse dyestuffs.

Dyestuffs have now been found which enable these difficulties to be overcome by a process in which hydrophobic synthetic organic material is dyed in a slightly acid, neutral or alkaline solution of temporarily water-soluble disperse dyestuffs according to the invention, which dyestuffs contain a group that can be split off under the dyeing conditions, the said group containing at least one water-solubilising group.

The invention thus relates to dyestuffs of the formula

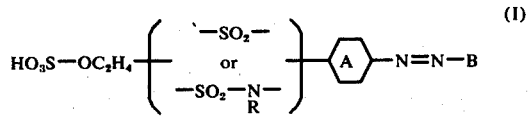

wherein B is a coupling component of the dispersion series, which coupling component is derived from an N-alkylated aniline or aminonaphthalene, and contains in the o-position with respect to the azo bridge a free or acylated primary or secondary amino group, and is free from water-solubilising groups, R is a hydrogen atom, a cycloalkyl group or an optionally substituted alkyl group, and the radical A optionally contains further substituents.

The new dyestuffs are obtained by a process in which the diazonium compound of an amine of the formula

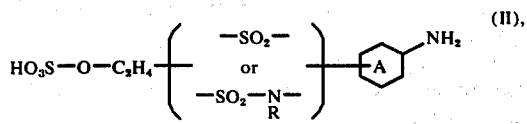

wherein R and A have the meanings given above, is coupled with a coupling component of the formula H—B, wherein B is the same as defined above.

Of particular interest are the dyestuffs of the formulae (III), (IV) and (V); the formulae of these dyestuffs are given below.

The dyestuffs (III) correspond to the formula

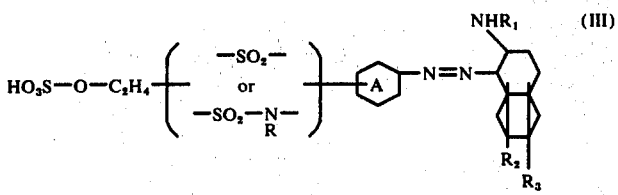

wherein R and A have the meanings defined above, and $R_1$ represents a hydrogen atom, a lower alkyl group or phenylalkyl group, and $R_2$ and $R_3$ each represent hydrogen or halogen atoms, lower alkyl, lower alkoxy, nitro, sulphonylamido, N-lower-alkyl-sulphonamido on N,N-di-lower-alkyl-sulphonylamido groups.

The dyestuffs (IV) correspond to the formula

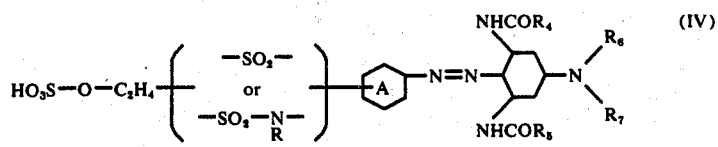

wherein $R_4$ and $R_5$ each independently represent a hydrogen atom, an optionally substituted alkyl, aryl, alkoxy, aryloxy, alkylamino or arylamino radical, or an (alkyloxy- or aryloxy-)carbonyl radical, or an (alkyloxy- or aryloxy-)carbonylalkyl radical, or an (aryloxy-, arylthio- or arylamino-)alkyl radical, or a styryl radical, or an aralkyl, thiophenyl or pyridyl radical, and $R_6$ and $R_7$ are optionally interrupted by at least one hetero atom, and/or represent optionally substituted alkyl radicals, and A and R have the previously defined meanings.

The dyestuffs (V) correspond to the formula

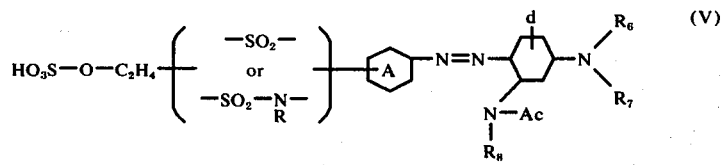

wherein Ac represents the acyl radical of a lower aliphatic or aromatic carboxylic acid, carbonic acid semiester, carbamic acid or sulphonic acid, or a radical of the formula —CO—$NH_2$; $d$ represents a hydrogen atom, a chlorine or bromine atom, a lower alkyl, lower alkylthio, phenyl, phenyloxy, phenylthio, lower alkyloxycarbonyl or lower alkylaminocarbonyl group; $R_8$ is a lower alkyl or preferably a hydrogen atom; and $R_6$, $R_7$, R and A have the previously defined meanings.

Preferably, $d$ is bound in the m-position to the azo group.

The benzene ring A can contain, e.g. the following substituents not producing an acid reactin on dissociatin in water:

chlorine or bromine atoms, methyl, ethyl, nitro, cyano, trifluoromethyl, methyl or ehtylsulphonyl, N-(methyl-, ethyl-, propyl-, butyl- or cyanoethyl-)aminosulphonyl, N,N-bis-(methyl-, ethyl- or hydroxyethyl-)aminosulphonyl, methoxy- or ethoxycarbonyl, acetylamino or propionylamino groups.

The radical R appearing in formulae I to V is, e.g. a hydrogen atom, an ethyl, propyl, butyl, benzyl, $\beta$-cyanoethyl, $\beta$-hydroxyethyl, $\beta$-chloroethyl or cyclohexyl group.

The radical $R_1$ stands as a rule for a hydrogen atom, a methyl, ethyl, propyl, butyl, benzyl, phenylethyl, hydroxyethyl or cyanoethyl group.

The radicals $R_2$ and $R_3$ each independently represent, e.g. hydrogen atoms, chlorine or bromine atoms, methyl, ethyl, propyl, butyl, methoxy, ethoxy, propoxy, butoxy, nitro, aminosulphonyl, N-(methyl-, ethyl-, propyl- or hydroxyethyl-)aminosulphonyl, N,N-bis-(methyl-, ethyl-, propyl-, butyl- or hydroxyethyl-)aminosulphonyl, methyl- or ethylsulphonyl or (methoxy- or ethoxy-)sulphonyl groups.

The radicals —CO—$R_4$ and —CO—$R_5$ in the dyestuffs of formula IV can be identical to or different from each other.

The radicals —CO—$R_4$ and —CO—$R_5$ and the radical Ac in the dyestuffs of formula IV represent unsubstituted or substituted fatty acid radicals, such as formyl, acetyl, propionyl, butyryl, 1-methylbutyryl, hexanoyl, crotonyl, octanoyl, decanoyl, dodecanoyl, hexadecanoyl, palmityl or stearyl radicals, also a glycol or methylmercaptoacetic acid radical, chloroacetyl, $\alpha,\beta$-dibromo- or dichloropropionyl, $\beta$-bromopropionyl, 4-chlorobutyryl, cyanoacetyl, acetoacetyl, ethoxyacetyl, bromoacetyl, 2-phenylbutyryl, 4-benzoyl-butyryl, 4-phenyl-butyryl, cyclohexanebutyryl, 2-bromostearyl, 11-bromoundecanoyl, palmitoyl,·glycoyl and 3- and 4-hydroxybutyryl radicals.

Radicals —CO—$R_4$, —CO—$R_5$ and Ac are furthermore: the semi-esterified dicarboxylic acid radicals of the general formula (aryloxy- or lower-alkoxy-)—CO—$(CH_2)_{m-1}$—CO—, wherein $m$ = 1–9. Examples of these are: the methoxycarbonylcarbonyl radical, the $C_2H_5$—O—CO—$(CH_2)_4$—CO— radical, and the p-$CH_3$—$C_6H_4$—O—CO—$CH_2CH_2$—CO radical; semi-esterified acyl radicals of oxalic acid, such as the radicals of the formulae $CH_3$—O—CO—CO—, $C_4H_9$—O—CO—CO—, p-$CH_3C_6H_4$—O—CO—CO, o-$CH_3$—$C_6H_4$—O—CO—CO—, p-$CH_3C_6H_4$O—CO—CO— and p-$C_2H_5$—O—$C_6H_4$—O—CO—CO, the radicals of cycloaliphatic carboxylic acids, such as the cyclohexanecarbonyl, methylcyclohexanecarbonyl and dimethylcyclohexanecarbonyl radical; the radicals of araliphatic carboxylic acids, such as the phenylacetyl, $\beta$-phenylpropionyl, phenoxyacetyl, (p-nitro-, p-acetyl-, o-butoxycarbonyl-, o-methoxy-, p-butoxy-, p-methyl-, p-bromo-, 3,5-dichloro-, p-ethyl- or p-chloro-)phenoxyacetyl, phenoxypropionyl, phenoxybutyryl, phenoxythioacetyl, 3,5-dichlorophenylthioacetyl, p-methoxycarbonylphenylmercaptoacetyl, $\alpha$-phenylmercapto-propionyl, $\gamma$(p-nitrophenylmercaptobutyryl, phenylaminoacetyl, p-chlorophenylaminoacetyl, m-ethylphenylaminoacetyl, N-morpholinoacetyl, styrylcarbonyl and cinnamylcarbonyl radicals; the radicals of aromatic carboxylic acids, such as the benzoyl, methylbenzoyl, p-chlorobenzoyl, p-nitrobenzoyl, 3,5-dinitrobenzoyl, methoxybenzoyl, 4-phenoxybenzoyl, 4-phenylbenzoyl, 4-phenylmercapto-benzoyl, 4-phenylazobenzoyl, $\alpha$-naphthoyl and $\beta$-naphthoyl radicals; and the radicals of heterocyclic carboxylic acids, such as the furoyl, nicotinyl, thiophene-2-carbonyl or pyridine-3- or 4-carbonyl radicals.

The acyl radicals —CO—$R_4$, —CO—$R_5$ and Ac can be derived also from alkyl- or aryl-semi-esters of carbonic acid, and $R_4$ and $R_5$ then stand for $C_1$–$C_8$-alkoxy groups or for optionally substituted phenoxy groups, such as, e.g. for methoxy, ethoxy, n-propyloxy, isopropyloxy, $\beta$-chloroethoxy, $\beta$-methoxyethoxy, n-butoxy, isobutoxy and hexyloxy groups, also for phenoxy, chlorophenoxy, bromophenoxy, nitrophenoxy, carbethoxyphenoxy, methoxyphenoxy, methylphenoxy or ethylphenoxy radicals.

The acyl radicals —$COR_4$, —$COR_5$ and Ac can be derived also from alkyl-, cycloalkyl- or arylcarbamic acids and heterocyclic carbamic acids, and $R_4$ and $R_5$ then stand for $C_1$–$C_8$-alkylamino or cyclohexylamino groups, or for optionally substituted phenylamino groups, such as, methylamino, ethylamino, propylamino, butylamino, octylamino, cyclohexylamino, phenylamino, (chloro-, bromo-, methyl-, methoxy-, ethoxy-, nitro-, trifluoromethyl-, methoxycarbonyl- or ethoxycarbonyl-)phenylamino, dimethylphenylamino, naphthylamino, 3-pyridylamino, 3-tetramethylenesulphone-amino, furfurylamino or thiophene-amino groups.

The groups $R_6$ and $R_7$ can be be lower alkyl groups, i.e., alkyl groups containing 1 to 4 carbon atoms, preferably 2 to 4 carbon atoms, such as methyl, ethyl, n- propyl or n-butyl groups, which can be interrupted by one or two oxygen atoms, and/or be substituted in the usual manner. Suitable substituents are: halogen atoms, preferably fluorine, chlorine or bromine atoms, phenyl, lower-alkoxy, lower-alkylcarbonyloxy, lower-alkylcarbonylamino, benzoyloxy, benzoylamino (whereby the benzoyl groups can be substituted by chlorine, bromine, methyl, ethyl, methoxy and ethoxy groups), cyano, hydroxy, phenoxy, phenylcarbonyl, phenylsulphonyloxy, phenoxycarbonyl, phenylthio (whereby the phenyl groups can be substituted in each case by chlorine, bromine, methyl, ethyl, methoxy or ethoxy groups), lower-alkylsulphonyl, lower-alkoxycarbonyloxy, phenoxycarbonyloxy, and phenylaminocarbonyloxy, aminocarbonyl, mono-lower-alkylaminocarbonyl, di-lower-alkylaminocarbonyl, lower-alkylcarbonyl, succinimido, phthalimido, lower-alkoxycarbonyl, cinnamoyl, thiophenecarbonyl, pyridinecarbonyl, phenoxyalkylcarbonyloxy, phenylaminoalkylcarbonyloxy, (lower-alkoxy- or phenyloxy)carbonylalkylcarbonyl (oxy- or amino) groups. $R_6$ can also be hydrogen.

Suitable groups $R_6$ and/or $R_7$ are, e.g. those of the formulae:

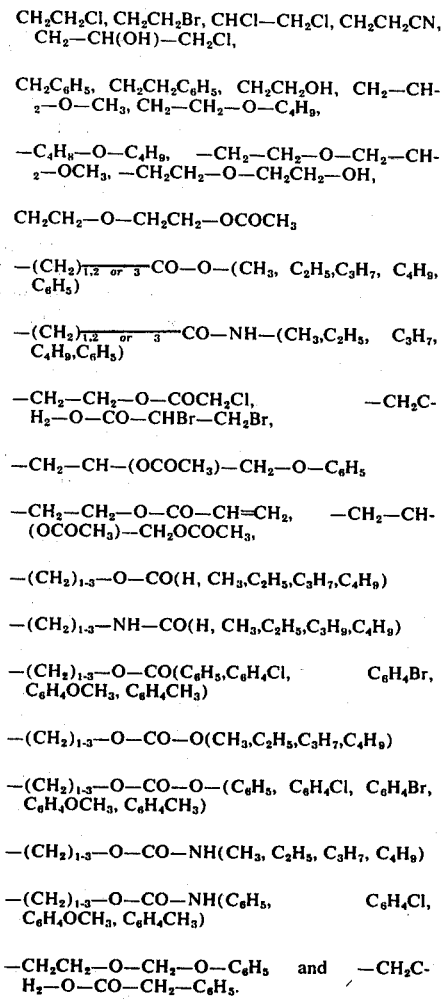

In addition to possessing the meanings given for —CO—$R_4$ and —CO—$R_5$, the radical Ac can also stand for an alkylsulphonyl group or for benzenesulphonyl groups, such as, e.g. a methane, ethane, butane, propane, benzene, p-toluene, p-bromotoluene or p-nitrobenzenesulphonyl group.

Suitable coupling components are, e.g. the amines of the formulae

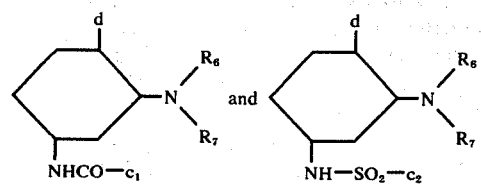

wherein $c_1$ represents a hydrogen atom, an optionally substituted lower-alkyl, cycloalkyl or lower-alkoxy group or a benzene radical, and $c_2$ represents a lower alkyl or benzene radical.

The following coupling components are listed as examples:
3($\beta$-chloropropionylamino)-N,N-diethylaniline,
3-acetamino-N,N-dibenzylaniline,
3-acetamino-6-methoxy-N,N-bis-($\beta$-hydroxyethyl)aniline,
3-acetamino-N,N-diethylaniline,
3-acetamino-N,N-bis-($\beta$,$\beta$-acetoxyethyl)-aniline,
3-acetamino-N,N-bis-($\beta$,$\beta$-cyanoethyl)-aniline,
3-acetamino-N-ethyl-N-$\beta$-cyanoethyl-aniline,
3-acetamino-6-methoxy-N,N-bis($\beta$-cyanoethyl)-aniline,
3-formylamino-N,N-diethylaniline,
3-propionylamino-N-ethyl-N-($\beta$-acetoxyethyl)-aniline,
3-acetylamino-N-ethyl-N-($\beta$-acetoxyethyl)-aniline,
3-chloroacetyl-N,N-diethylaniline,
3-acetamino-N,N-bis-($\beta$-cyanoethoxyethyl)-aniline,
3-acetamino-6-methoxy-N-($\beta$-cyanoethoxyethyl)-aniline,
3-acetamino-6-methoxy-N-($\beta$-acetoxyethyl)-N-($\beta$-cyanoethoxyethyl)-aniline,
3,5-bis(acetylamino-N-($\beta$-cyanoethyl)-N-ethyl-aniline,
(obtainable by reaction of 3,5-diacetamido-aniline with acrylonitrile and subsequently with diethylsulphate),
2,5-bis-(acetylamino)-N,N-bis-($\beta$-acetoxyethyl)-aniline,
3-methanesulphonylamino-N,N-bis($\beta$-acetoxyethyl)-aniline,
2-ethylamino-3-cyano-4,6-diamino-pyridine, 2-cyclohexylamino-3-aminocarbonyl-4,6-diamino-pyridine,
2-phenoxy-3-cyano-4,6-diamino-pyridine
(the last-mentioned coupling components are obtainable by reaction of 2-bromo-3-cyano-4,6-diamino-pyridine and ethylamine, cyclohexylamino or phenol/phenol/potassium carbonate, and in the case of aminocarbonyl compound subsequent heating in sulphuric acid);
2-diethylamino-3-cyano-4-methyl-6-($\beta$-hydroxyethylamino)-pyridine, and
2,6-bis($\beta$-hydroxyethylamino)-3-cyano-4-methyl-pyridine.

The coupling can be performed in a manner known per se, preferably in an acid medium, optionally in the presence of sodium acetate, or of similar buffer substances or catalysts influencing the rate of coupling, such as, e.g. dimethylformamide or pyridine, and salts thereof.

The new dyestuffs are excellently suitable for the printing and, in particular, dyeing of semi-synthetic or, preferably, fully-synthetic materials, especially textile fibres.

Examples of substrates are materials such as polyacrylonitrile, and mixed polymers made from acrylonitrile and other vinyl compounds, such as acrylic esters, acrylamides, vinyl pyridine, vinyl chloride or vinylidene chloride, mixed polymers from dicyanoethylene and vinyl acetate, as well as from acrylonitrile block-copolymers, polyurethanes, synthetic polyamides such as poly(hexamethylene-adipic acid amide) or polyamide 6.6, poly(ω-caprolactam) or polyamide 6, poly(hexamethylenesebacic acid amide) or polyamide 6.10, and poly(11-aminoundecanoic acid or polyamide 11, preferably cellulose tri- and 2½-acetate, and, in particular, aromatic polyesters, such as those from terephthalic acid and ethylene glycol or 1,4-dimethylolcyclohexane, and mixed polymers from terephthalic and isophthalic acid with ethylene glycol and, optionally, 1,4-dimethylolcyclohexane.

These materials can be in the most diverse stages of processing: for instance, they can be in the form of threads, knitwear, fabrics, yarns or fibres.

These materials are dyed with the dyestuffs according to the invention under such conditions that the dyestuffs of the formula

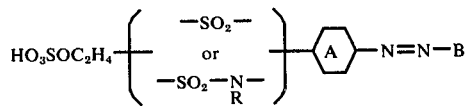

are split as follows:

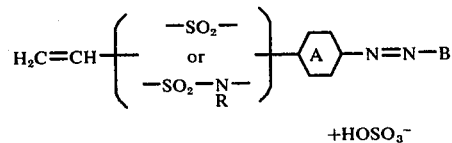

By this reaction there is formed a water-insoluble disperse dyestuff, which is absorbed as such onto the material.

This is effected by a process in which the material is dyed at elevated temperature, e.g. at 80° to 130°C, optionally under pressure, in a slightly acid, neutral or alkaline bath, with a pH-value of ca. 3 to 8, preferably 5 to 7; to this dye bath are optionally added also buffer substances, such as disodium phosphate.

The said process has the advantage that it is extraordinarily simple to perform. Both the dyeing and the printing process can be carried out by the usual operating methods; no unusual substances are used along with the new dyestuff derivatives, no disproportionately large amounts of auxiliaries are required, and no special equipment is necessary.

Compared with conventional disperse dyeing processes, this process offers definite advantages, some of which have already been mentioned: namely, that the dyestuffs do not have to be in dispersion form, a factor which eliminates the complicated grinding problems otherwise associated with disperse dyestuffs. Furthermore, there is no need for the application of dispersing agents, which contaminate the waste-water and which in most cases are toxic; and in this connection there is the further advantage that the troublesome problems arising as a result of foam in large dyeing apparatus do not exist in the case of the process according to the invention.

Where not otherwise stated, the term 'parts' in the following examples denotes parts by weight, percentages are expressed as per cent by weight, and temperatures are given in degrees Centigrade. Between part by weight and part by volume there is the same ratio as between gram and milliliter.

EXAMPLE

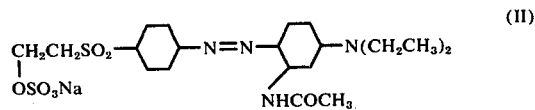

An amount of 0.1 mole of 1-aminophenyl-4(β-hydroxyethylsulphone) is added at 10° C to 30 ml of concentrated sulphuric acid, and stirring maintained overnight to obtain complete solution. The solution is then poured onto a minimum amount of ice, so that the temperature remains at 0° C. After filtration, the rigorously pressed out paste is suspended in 350 ml of ice water; an addition is made of 0.15 mole of conc. hydrochloric acid, and the whole titrimetrically diazotised at 0–5° C with 4N sodium nitrite solution. Diazotisation is completed in the course of half an hour at 0°–5° C with a slight nitrite excess: nitrite consumption between 0.085 and 0.09 mole. After destruction of the nitrite excess with sulphamic acid solution, an amount corresponding to the consumption of nitrite of the finely powdered coupling component 3-acetamino-N,N-diethylaniline is added by sprinkling. Stirring is performed for 2 hours in an ice bath, and neutralisatin then effected with sodium acetate. After a further 4 hours, the dyestuff of formula II is salted out with brine and subsequently filtered.

After drying in vacuo at 60°, there is obtained 21 g of an orange powder. The dyestuff dissolved in water to give a clear solution: it therefore does not have to be ground and dispersed. With a pH-value of 5 and a dyeing temperature of 100°, the said dyestuff yields on polyester fibers a brilliant orange-red dyeing which has good fastness to light, rubbing, perspiration and sublimation.

The following dyestuffs can be prepared in an analogous manner:

| | | Shade on Polyester fibres |
|---|---|---|
| 1 | 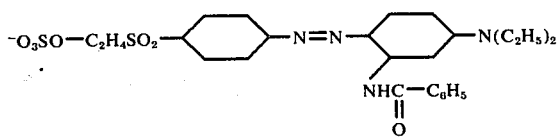 | orange |

|   |   | Shade on Polyester fibres |
|---|---|---|
| 2 | $^-O_3SO-C_2H_4SO_2-\text{C}_6H_4-N=N-\text{C}_6H_3(NHCOCH_3)-N(CH_2C_6H_5)(C_2H_4OH)$ | orange |
| 3 | $^-O_3SO-C_2H_4SO_2-\text{C}_6H_4-N=N-\text{C}_6H_3(NHCOCH_3)-N(C_2H_4CN)(C_2H_4OH)$ | yellowish-orange |
| 4 | $^-O_3SOC_2H_4SO_2-\text{C}_6H_3(Cl)-N=N-\text{C}_6H_3(NHCOCH_3)-N(C_2H_5)_2$ | scarlet |
| 5 | $^-O_3SOC_2H_4SO_2-\text{C}_6H_2(Br)_2-N=N-\text{C}_6H_3(NHCOCH_3)-N(C_2H_5)_2$ | yellowish-orange |
| 6 | $O_2N-\text{C}_6H_3(SO_2C_2H_4OSO_3^-)-N=N-\text{C}_6H_3(NHCOCH_3)-N(C_2H_5)_2$ | reddish-violet |
| 7 | $O_2N-\text{C}_6H_2(NO_2)(SO_2C_2H_4OSO_3)-N=N-\text{C}_6H_3(NHCOCH_3)-N(C_2H_5)_2$ | reddish-blue |
| 8 | $\text{C}_6H_3(OCH_3)(SO_2C_2H_4OSO_3^-)-N=N-\text{C}_6H_3(NHCOCH_3)-N(C_2H_5)_2$ | orange |
| 9 | $^-O_3SO-C_2H_4-SO_2NH-\text{C}_6H_4-N=N-\text{C}_6H_3(NHCOCH_3)-N(C_2H_5)_2$ | yellowish-orange |
| 10 | $^-O_3SO-C_2H_4-SO_2-N(CH_3)-\text{C}_6H_4-N=N-\text{C}_6H_3(NHCOCH_3)-N(C_2H_5)_2$ | yellowish-orange |

-continued

| | | Shade on Polyester fibres |
|---|---|---|
| 11 | ⁻O₃SO—C₂H₄—SO₂—N(C₂H₄CN)—C₆H₄—N=N—C₆H₃(NHCOCH₃)—N(C₂H₅)₂ | yellowish-orange |
| 12 | ⁻O₃SO—C₂H₄—SO₂—C₆H₃(Cl)—N=N—[naphthyl(NHCH₃)(SO₂NHCH₃)] | red |
| 13 | ⁻O₃SOC₂H₄SO₂—C₆H₄—N=N—C₆H₂(OCH₃)(NHCOCH₃)—N(C₂H₅)₂ | red |
| 14 | ⁻O₃SOC₂H₄SO₂—C₆H₄—N=N—C₆H₂(OC₂H₅)(NHCOCH₃)—N(C₂H₅)₂ | red |
| 15 | ⁻O₃SOC₂H₄SO₂N(CH₃)—C₆H₄—N=N—C₆H₂(OCH₃)(NHCOCH₃)—N(C₂H₅)₂ | yellowish-red |
| 16 | ⁻O₃SOC₂H₄SO₂NH—C₆H₂(Cl)(Cl)—N=N—C₆H₃(NHCOCH₃)—N(C₂H₅)₂ | orange-brown |
| 17 | ⁻O₃SOC₂H₄SO₂NH—C₆H₃(CN)—N=N—C₆H₃(NHCOCH₃)—N(C₂H₅)₂ | yellowish-red |
| 18 | ⁻O₃SOC₂H₄SO₂NH—C₆H₃(CF₃)—N=N—C₆H₃(NHCOCH₃)—N(C₂H₅)₂ | yellowish-red |
| 19 | ⁻O₃SOC₂H₄SO₂NH—C₆H₃(Cl)—N=N—C₆H₃(NHCOCH₃)—N(C₂H₅)₂ | orange |
| 20 | ⁻O₃SOC₂H₄SO₂NH—C₆H₂(Cl)(Cl)—N=N—C₆H₃(NHCOCH₃)—N(C₂H₅)₂ | orange |
| 21 | ⁻O₃SOC₂H₄SO₂—C₆H₄—N=N—[naphthyl(NHC₂H₅)(SO₂OC₆H₅)] | orange |
| 22 | ⁻O₃SOC₂H₄SO₂—C₆H₄—N=N—[naphthyl(NHC₂H₄OH)(SO₂NHC₃H₇)] | orange |

-continued

| | | Shade on Polyester fibres |
|---|---|---|
| 23 | ⁻O₃SOC₂H₄SO₂—⟨⟩—N=N—[naphthyl with NHC₂H₅ and SO₂C₂H₅] | orange |
| 24 | ⟨⟩(SO₂NHC₂H₄OSO₃⁻)—N=N—[naphthyl with NHC₂H₅ and SO₂N(CH₃)₂] | orange |
| 25 | ⁻O₃SOC₂H₄SO₂—⟨⟩—N=N—[phenyl with NHCOCH₃, N(C₂H₅)₂, NHCOCH₃] | yellowish-red |
| 26 | ⁻O₃SOC₂H₄SO₂—⟨⟩—N=N—[phenyl with NHCOCH₃, N(C₂H₄OH)₂, NHCOCH₃] | yellowish-red |
| 27 | ⁻O₃SOC₂H₄SO₂—⟨⟩—N=N—[phenyl with NHCOCH₃, N(CH₂C₆H₅)₂, NHCOCH₃] | yellowish-red |

Obtained in the same manner are dyestuffs of the formula

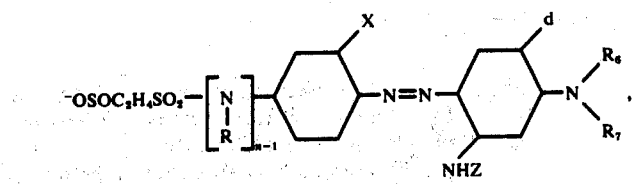

wherein the symbols have the meanings given in the following table.

| No. | R | n | X | d | Z | R₆ | R₇ | Shade on polyester fibres |
|---|---|---|---|---|---|---|---|---|
| 28 | — | 1 | H | H | COCH₃ | CH₂C₆H₅ | CH₂C₆H₅ | orange |
| 29 | — | 1 | H | H | COCH₃ | C₂H₄CH | C₂H₄OH | " |
| 30 | — | 1 | H | H | COCH₃ | CH₂CHCH₂OH<br>\|<br>OH | C₂H₅ | " |
| 31 | — | 1 | H | H | COCH₃ | C₂H₄OCOCH₃ | C₂H₄OCOCH₃ | yellowish-orange |
| 32 | — | 1 | H | H | COCH₃ | C₂H₄Cl | C₂H₄Cl | orange |
| 33 | — | 1 | H | H | COCH₃ | C₂H₄OCH₃ | C₂H₅ | " |
| 34 | — | 1 | H | H | COCH₃ | C₂H₄OSO₂C₆H₅ | C₂H₅ | " |
| 35 | CH₃ | 2 | H | H | COCH₃ | C₂H₄OCOCH₃ | C₂H₅ | yellowish-orange |
| 36 | H | 2 | Cl | H | COCH₃ | C₂H₄COOCH₃ | C₂H₅ | orange |
| 37 | H | 2 | H | H | COCH₃ | C₂H₄OCONHC₆H₅ | C₂H₅ | yellowish-orange |
| 38 | — | 1 | H | H | COCH₃ | CH₂CH—CH₂Br<br>\|<br>Br | C₂H₅ | orange |
| 39 | — | 1 | H | H | COCH₃ | C₂H₄OCO—[thienyl] | C₂H₅ | orange |
| 40 | HC(CH₃)₂ | 2 | H | H | COCH₃ | C₂H₅ | C₂H₅ | yellowish-orange |

-continued

| No. | | n | X | d | Z | | R₇ | R₈ | Shade on polyester fibres |
|---|---|---|---|---|---|---|---|---|---|
| 41 | C₂H₄OH | 2 | Cl | H | COCH₃ | | C₂H₅ | C₂H₅ | orange |
| 42 | ⟨H⟩ (cyclohexyl) | 2 | H | H | COCH₃ | | C₂H₅ | C₂H₅ | " |
| 43 | — | 1 | H | H | COC₂H₄Cl | | C₂H₅ | C₂H₅ | " |
| 44 | — | 1 | H | H | COCH—CH₂Br | | C₂H₅ | C₂H₅ | " |
| 45 | — | 1 | H | H | COCH=CH₂ | | C₂H₅ | C₂H₅ | " |
| 46 | — | 1 | H | H | COCOOC₂H₅ | | C₂H₅ | C₂H₅ | " |
| 47 | — | 1 | H | H | CO(CH₂)₄COC₂H₅ ‖ O | | C₂H₅ | C₂H₅ | " |
| 48 | — | 1 | H | H | CO—⟨H⟩ | | C₂H₅ | C₂H₅ | " |
| 49 | — | 1 | H | H | COCH₂C₆H₅ | | C₂H₅ | C₂H₅ | " |
| 50 | — | 1 | H | H | CO—(piperidine) | | C₂H₅ | C₂H₅ | " |
| 51 | — | 1 | H | H | COOC₂H₅ | | C₂H₅ | C₂H₅ | " |
| 52 | — | 1 | H | H | CONHC₆H₅ | | C₂H₅ | C₂H₅ | " |
| 53 | — | 1 | H | H | SO₂CH₃ | | C₂H₅ | C₂H₅ | red |
| 54 | — | 1 | H | H | SO₂—⟨⟩—CH₃ | | C₂H₅ | C₂H₅ | red |
| 55 | — | 1 | H | H | SO₂—⟨⟩—Cl | | C₂H₅ | C₂H₅ | red |

| No. | n | X | d | Z | R₇ | R₈ | Shade on polyester fibres |
|---|---|---|---|---|---|---|---|
| 56 | 1 | H | H | COCH₃ | C₂H₄—C₆H₅ | C₂H₅ | orange |
| 57 | 1 | H | H | COCH₃ | C₂H₄—OCO—C₆H₅ | C₂H₅ | " |
| 58 | 1 | H | H | COCH₃ | C₂H₄—O—CO—C₃H₇ | C₂H₅ | " |
| 59 | 1 | H | H | COCH₃ | C₄H₉ | CH₂CH₂CN | " |
| 60 | 1 | H | H | COCH₃ | C₂H₄—O—C₂H₄CN | C₂H₅ | " |
| 61 | 1 | H | H | COCH₃ | CH₂—C₆H₅ | CH₂CH₂CN | " |
| 62 | 1 | H | H | COCH₃ | C₂H₄—CH₂CH₂CN | C₂H₄—O—CO—CH₃ | " |
| 63 | 1 | H | H | COCH₃ | C₂H₄—O—CO—CH₃ | CH₂CH₂CN | " |
| 64 | 1 | H | CH₃ | COCH₃ | C₂H₅ | C₂H₅ | " |
| 65 | 1 | H | H | SO₂C₄H₉ | C₂H₅ | C₂H₅ | red |
| 66 | 1 | H | Cl | COCH₃ | C₂H₅ | C₂H₅ | orange |
| 67 | 1 | H | COOCH₃ | COCH₃ | C₂H₅ | C₂H₅ | " |
| 68 | 1 | H | H | COCH₃ | CH₂CH—CH₂OCH₃ \| OH | CH₃ | " |

What we claim is:
1. A dyestuff which corresponds to the formula

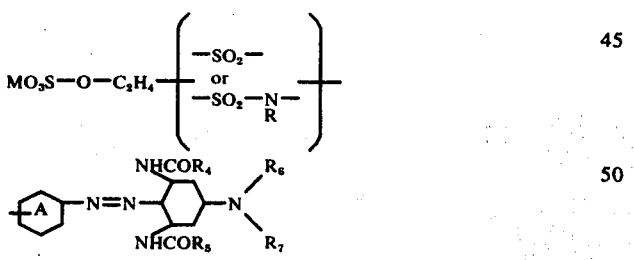

where
R₄ and R₅ are independently hydrogen, alkyl of up to 17 carbon atoms which is unsubstituted or substituted by hydroxy, methylmercapto, chloro, bromo, cyano, acetyl, ethoxy, phenyl, benzoyl, cyclohexyl, phenoxy, nitrophenoxy, acetylphenoxy, butoxycarbonylphenoxy, methoxyphenoxy, butoxyphenoxy, methylphenoxy, bromophenoxy, ethylphenoxy, chlorophenoxy, dichlorophenoxy, phenylmercapto, dichlorophenylmercapto, methoxycarbonylphenylmercapto, nitrophenylmercapto, phenylamino, chlorophenylamino or ethylphenylamino or; (aryloxy- or lower-alkoxy-) —CO(CH₂)$_{m-1}$, wherein m = 1 to 9, cyclohexyl, methylcyclohexyl, dimethylcyclohexyl, phenyl and phenyl substituted by methyl, chloro, nitro, methoxy, phenoxy, phenyl, phenylmercapto, phenylazo; naphthyl, alkoxy of up to 8 carbon atoms which is unsubstituted or substituted by chloro or methoxy; phenoxy which is unsubstituted or substituted by chloro, bromo, nitro, carbethoxy, methoxy, methyl or ethyl; alkylamino of 1 to 8 carbon atoms, cyclohexylamino, phenylamino which is unsubstituted or substituted by chloro, bromo, methyl, methoxy, ethoxy, nitro, trifluoromethyl, methoxycarbonyl, ethoxycarbonyl; or napthylamino, R₆ and R₇ are independently selected from the group consisting of lower alkyl which is unsubstituted or substituted by:
halo, phenyl, lower alkoxy, lower alkylcarbonyloxy, lower alkylcarbonylamino, benzoyloxy, benzoylamino which is unsubstituted or substituted by chloro, bromo, methyl, ethyl, methoxy or ethoxy; cyano, hydroxy, phenoxy, phenylcarbonyl, phenylsulphonyloxy, phenoxycarbonyl, or phenylthio, wherein said phenoxy, phenylcarbonyl, phenylsulphonyloxy, phenoxycarbonyl or phenylthio groups are unsubstituted or substituted by chloro, bromo, methyl, ethyl, methoxy, or ethoxy; lower alkylsulphonyl, lower alkoxycarbonyloxy, phenoxycarbonyloxy, phenylaminocarbonyloxy, aminocarbonyl, lower alkylaminocarbonyl, di-loweralkylaminocarbonyl, lower alkyl carbonyl, lower alkoxycarbonyl or cinnamoyl, and R is hydrogen, alkyl of up to 4 carbon atoms which is unsubstituted or substituted by phenyl, cyano, hydroxy or chloro; or is cyclohexyl, and the benzene ring A is unsubstituted or substituted by chloro, bromo, methyl, ethyl, nitro, cyano, trifluoromethyl, methyl- or ethyl-sulphonyl, N-(methyl-, ethyl-, propyl-, butyl- or cyanoethyl-) aminosulphonyl, N,N-bis-(methyl-, ethyl-, or hydroxyethyl-) aminosulphonyl, methoxycarbonyl, ethoxycarbonyl, acetylamino or propionylamino, and M is hydrogen or sodium.

2. A dyestuff which corresponds to the formula

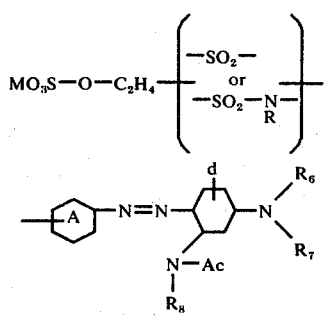

wherein $R_6$ and $R_7$ are independently selected from the group consisting of lower alkyl which is unsubstituted or substituted by:
halo, phenyl, lower alkoxy, lower alkylcarbonyloxy, lower alkylcarbonylamino, benzoyloxy, benzoylamino which is unsubstituted or substituted by chloro, bromo, methyl, ethyl, methoxy or ethoxy; cyano, hydroxy, phenoxy, phenylcarbonyl, phenylsulphonyloxy, phenoxycarbonyl, or phenylthio, wherein said phenoxy, phenylcarbonyl, phenylsulphonyloxy, phenoxycarbonyl or phenylthio groups are unsubstituted or substituted by chloro, bromo, methyl, ethyl, methoxy, or ethoxy; lower alkylsulphonyl, lower alkoxycarbonyloxy, phenoxycarbonyloxy, phenylaminocarbonyloxy, aminocarbonyl, lower alkylaminocarbonyl, di-loweralkylaminocarbonyl, lower alkyl carbonyl, lower alkoxycarbonyl or cinnamoyl, and $R_6$ can also represent hydrogen;

Ac represents $-CO-R_5$, $C_1-C_4$ alkylsulphonyl or an unsubstituted or substituted benzenesulphonyl group wherein the substituents are methyl, bromo, or nitro, $R_5$ is hydrogen, alkyl of up to 17 carbon atoms which is unsubstituted or substituted by hydroxy, methylmercapto, chloro, bromo, cyano, acetyl, ethoxy, phenyl, benzoyl, cyclohexyl, phenoxy, nitrophenoxy, acetylphenoxy, butoxycarbonylphenoxy, methoxyphenoxy, butoxyphenoxy, methylphenoxy, bromophenoxy, ethylphenoxy, chlorophenoxy, dichlorophenoxy, phenylmercapto, dichlorophenylmercapto, methoxycarbonylphenylmercapto, nitrophenylmercapto, phenylamino, chlorophenylamino or ethylphenylamino (aryloxy- or lower-alkoxy-) $-CO(CH_2)_{m-1}$, wherein $m = 1$ to 9, cyclohexyl, methylcyclohexyl, dimethylcyclohexyl, phenyl or phenyl substituted by methyl, chloro, nitro, methoxy, phenoxy, phenyl, phenylmercapto, phenylazo; napthyl, alkoxy of up to 8 carbon atoms which is unsubstituted or substituted by chloro or methoxy; phenoxy which is unsubstituted or substituted by chloro, bromo, nitro, carbethoxy, methoxy, methyl or ethyl; alkylamino of 1 to 8 carbon atoms, cyclohexylamino, phenylamino which is unsubstituted or substituted by chloro, bromo, methyl, methoxy, ethoxy, nitro, trifluoromethyl, methoxycarbonyl, ethoxycarbonyl; or napthylamino, $R_8$ is hydrogen or lower alkyl, d is hydrogen, chloro, bromo, lower alkyl, lower alkylthio, phenyl, phenoxy, phenylthio, loweralkoxycarbonyl or loweralkylaminocarbonyl, R is hydrogen, alkyl of up to 4 carbon atoms which is unsubstituted or substituted by phenyl, cyano, hydroxy or chloro; or is cyclohexyl, and the benzene ring A is unsubstituted or substituted by chloro, bromo, methyl, ethyl, nitro, cyano, trifluoromethyl, methyl- or ethyl-sulphonyl, N-(methyl-, ethyl-, propyl-, butyl- or cyanoethyl-) aminosulphonyl, N,N-bis-(methyl-, ethyl-, or hydroxyethyl-) aminosulphonyl, methoxycarbonyl, ethoxycarbonyl, acetylamino or propionylamino, and M is hydrogen or sodium.

3. A dyestuff according to claim 1, wherein $R_6$ and $R_7$ represent phenyl-lower-alkyl, cyano-lower-alkyl, cyanoethoxy-lower-alkyl, lower-alkylcarbonyloxy-lower-alkyl, lower-alkoxy-lower-alkyl or lower-alkyl.

4. A dyestuff according to claim 2, wherein d is hydrogen.

5. A dyestuff according to claim 2, wherein Ac is lower alkylcarbonyl.

6. A dyestuff as claimed in claim 2 of the formula

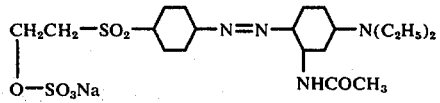

7. A dyestuff as claimed in claim 2 of the formula

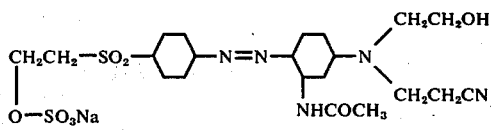

8. A dyestuff as claimed in claim 2 of the formula

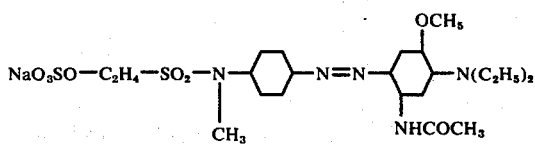

9. A dyestuff as claimed in claim 1 of the formula

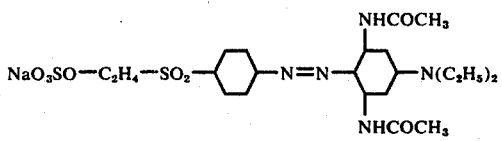

* * * * *